US010528265B1

(12) United States Patent
Malina et al.

(10) Patent No.: US 10,528,265 B1
(45) Date of Patent: Jan. 7, 2020

(54) WRITE LATENCY REDUCTION

(71) Applicant: Western Digital Technologies, Inc., Irvine, CA (US)

(72) Inventors: James N. Malina, Irvine, CA (US); Kent Anderson, Broomfield, CO (US); James C. Alexander, Newport Coast, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 266 days.

(21) Appl. No.: 15/256,522

(22) Filed: Sep. 3, 2016

(51) Int. Cl.
*G06F 3/06* (2006.01)
*G06F 12/02* (2006.01)

(52) U.S. Cl.
CPC .......... *G06F 3/0611* (2013.01); *G06F 3/0619* (2013.01); *G06F 3/0638* (2013.01); *G06F 3/0659* (2013.01); *G06F 3/0683* (2013.01); *G06F 12/0253* (2013.01); *G06F 2212/1024* (2013.01); *G06F 2212/1044* (2013.01)

(58) Field of Classification Search
None
See application file for complete search history.

(56) References Cited

U.S. PATENT DOCUMENTS 8,738,855 B2 5/2014 Spiegeleer et al.
8,914,669 B2 12/2014 Dhuse et al.
9,053,114 B1 6/2015 Lemar et al.
2011/0126045 A1* 5/2011 Bennett .............. G06F 11/1068 714/6.22
2011/0185258 A1 7/2011 Grube et al.
2013/0211809 A1 8/2013 Maruyama
2014/0026017 A1 1/2014 Grube et al.
2014/0068320 A1* 3/2014 Vedpathak .......... G06F 21/6272 714/6.2
2015/0089328 A1 3/2015 Lee et al.
2015/0234716 A1* 8/2015 Brooker ................. G06F 12/02 714/47.1
2015/0254003 A1 9/2015 Lee et al.
2015/0331744 A1 11/2015 Slik (Continued)

OTHER PUBLICATIONS

Brewer et al., Disks for Data Centers, White paper for FAST 2016, Google, Inc., Version 1.1, Feb. 23, 2016, 16 pgs; available at http://research.google.com/pubs/pub44830.html.

(Continued)

*Primary Examiner* — Tracy A Warren

(57) ABSTRACT

A data storage system includes a plurality of Data Storage Devices (DSDs). A write command is sent to each DSD of the plurality of DSDs to each store one or more erasure coded shards of an overprovisioned number of shards. The overprovisioned number of shards is generated from an erasure coding on data to provide at least a predetermined level of data reliability. Write complete indications are received for a threshold number of shards less than the overprovisioned number of shards, with each write complete indication indicating that one or more shards of the overprovisioned number of shards has been stored in a DSD. It is determined that the data has been written with at least the predetermined level of data reliability after receiving write complete indications for the threshold number of shards, but before receiving write complete indications for all of the overprovisioned number of shards.

30 Claims, 8 Drawing Sheets

(56) References Cited

U.S. PATENT DOCUMENTS

| | | | | |
|---|---|---|---|---|
| 2016/0041868 | A1 | 2/2016 | Davis et al. | |
| 2016/0062832 | A1 | 3/2016 | Slik | |
| 2016/0062833 | A1 | 3/2016 | Slik | |
| 2016/0062834 | A1 | 3/2016 | Benight et al. | |
| 2016/0062837 | A1 | 3/2016 | Slik | |
| 2016/0277502 | A1 | 9/2016 | Resch et al. | |
| 2017/0063704 | A1 | 3/2017 | Krinsky | |
| 2017/0111477 | A1 | 4/2017 | Davis et al. | |
| 2017/0160966 | A1* | 6/2017 | Baptist | G06F 3/0619 |
| 2017/0262191 | A1* | 9/2017 | Dewakar | G06F 3/0611 |

OTHER PUBLICATIONS

Co-pending U.S. Appl. No. 15/373,450, filed Dec. 8, 2016, entitled "Read Tail Latency Reduction".

Co-pending U.S. Appl. No. 15/373,456, filed Dec. 8, 2016, entitled "Read Tail Latency Reduction".

* cited by examiner

| Time | DSD/ MP 1 | DSD/ MP 2 | DSD/ MP 3 | DSD/ MP 4 | DSD/ MP 5 | DSD/ MP 6 | DSD/ MP 7 | DSD/ MP 8 | DSD/ MP 9 | DSD/ MP 10 | DSD/ MP 11 | DSD/ MP 12 | DSD/ MP 13 | DSD/ MP 14 | DSD/ MP 15 | DSD/ MP 16 | DSD/ MP 17 | DSD/ MP 18 |
|---|---|---|---|---|---|---|---|---|---|---|---|---|---|---|---|---|---|---|
| T1 | N | N | Y | N | Y | N | N | N | Y | N | N | Y | N | N | Y | Y | N | N |
| T2 | Y | N | Y | N | Y | N | N | Y | Y | Y | N | Y | Y | N | Y | Y | N | Y |
| T3 | Y | N | Y | Y | Y | Y | Y | Y | Y | Y | Y | Y | Y | Y | Y | Y | Y | Y |
| **T4** | **Y** | **Y** | **Y** | **Y** | **Y** | **Y** | **Y** | **Y** | **Y** | **Y** | **Y** | **Y** | **Y** | **Y** | **Y** | **Y** | **Y** | **Y** |

| Time | DSD/ MP 1 | DSD/ MP 2 | DSD/ MP 3 | DSD/ MP 4 | DSD/ MP 5 | DSD/ MP 6 | DSD/ MP 7 | DSD/ MP 8 | DSD/ MP 9 | DSD/ MP 10 | DSD/ MP 11 | DSD/ MP 12 | DSD/ MP 13 | DSD/ MP 14 | DSD/ MP 15 | DSD/ MP 16 | DSD/ MP 17 | DSD/ MP 18 | DSD/ MP 19 |
|---|---|---|---|---|---|---|---|---|---|---|---|---|---|---|---|---|---|---|---|
| T1 | N | N | Y | N | Y | N | N | N | Y | N | N | Y | N | N | Y | Y | N | N | N |
| T2 | Y | N | Y | N | Y | N | N | Y | Y | Y | N | Y | Y | N | Y | Y | N | Y | Y |
| **T3** | **Y** | **N** | **Y** | **Y** | **Y** | **Y** | **Y** | **Y** | **Y** | **Y** | **Y** | **Y** | **Y** | **Y** | **Y** | **Y** | **Y** | **Y** | **Y** |
| T4 | Y | Y | Y | Y | Y | Y | Y | Y | Y | Y | Y | Y | Y | Y | Y | Y | Y | Y | Y |

FIG. 3B

WRITE LATENCY REDUCTION

BACKGROUND

Data Storage Devices (DSDs) are often used to record data on or to reproduce data from a storage media such as, for example, a rotating magnetic disk or a solid-state memory. In some cases, a DSD or a portion of the storage media in a DSD may become damaged or otherwise unreliable for storing data. To help protect against data loss, a data storage system or a DSD can store redundant data in different storage locations to provide a certain level of data reliability.

In one example, a data storage system can use erasure coding to protect against data loss by storing data as erasure coded shards in different storage locations. In erasure coding, data is broken into fragments that can be each expanded and encoded with redundant data to form an erasure coded shard.

Depending on the number of shards, a predetermined level of data reliability or durability can be achieved since the original data object can be reconstructed using less than all of the data shards. This can allow for the loss of some data shards while still being able to recover the original data. For example, where a data object is broken into ten fragments, the fragments can be encoded into fourteen data shards to provide for a predetermined level of data reliability referred to as a ten of fourteen configuration, or EC 10/14. In this example, the fourteen data shards are written in different storage locations in the data storage system and the original data object can be reconstructed using any ten of the fourteen data shards. This can allow for the retrieval of up to four of the fourteen shards to fail while still being able to reconstruct the original data object.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 3A is an example illustrating the receipt of write complete indications for erasure coded shards.

FIG. 3B is an example illustrating the receipt of write complete indications for an overprovisioned number of shards according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
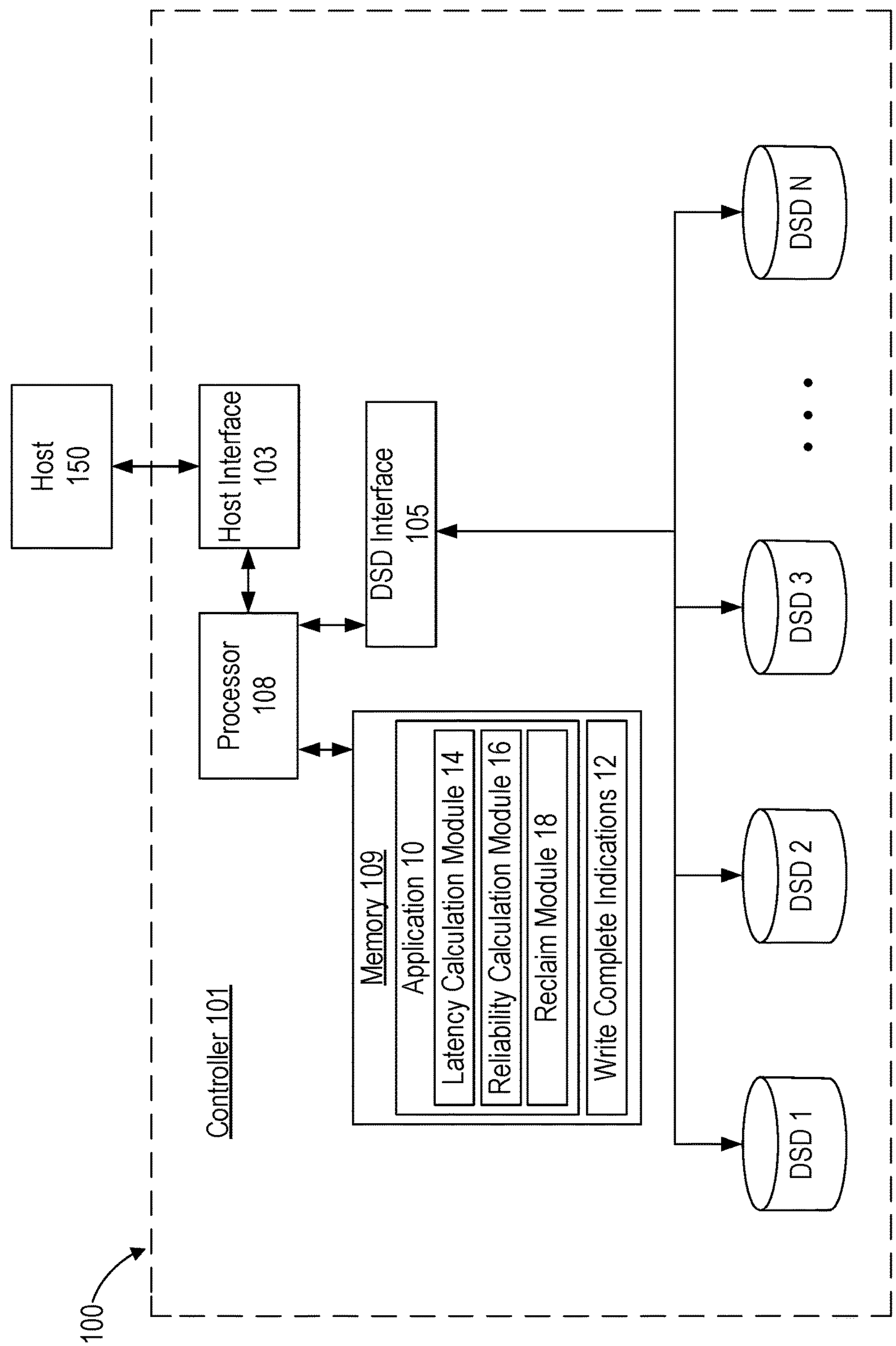
FIG. 1 is a block diagram of a data storage system according to an embodiment.

FIG. 1 is a block diagram of data storage system 100 according to an embodiment where data shards are stored in different Data Storage Devices (DSDs) of data storage system 100. As shown in FIG. 1, data storage system 100 is accessed by host 150 to store and retrieve data from data storage system 100. Host 150 may, for example, use data storage system 100 for storing data remotely such as for a mobile or social media application executed by host 150 or for a distributed computing or big data application executed by host 150. In this regard, host 150 and data storage system 100 may or may not be physically co-located so that the connection between host 150 and data storage system 100 may include a local area network, a wide area network, or the Internet.

In the example of FIG. 1, data storage system includes controller 101 and DSDs 1 to N. DSDs 1 to N can include DSDs of a same type of storage media such as when all of DSDs 1 to N are Hard Disk Drives (HDDs) that use a rotating magnetic disk as storage media or as when all of DSDs 1 to N are Solid-State Drives (SSDs) that store data in a solid-state storage media such as a flash memory. In other implementations, DSDs 1 to N may include a mix of different types of DSDs that may include different types of storage media, such as when DSDs 1 to N include both HDDs and SSDs.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

As shown in FIG. 1, controller 101 of data storage system 100 includes host interface 103, DSD interface 105, processor 108, and memory 109. Host interface 103 is configured to interface controller 101 with host 150 and may interface according to a standard such as, for example, SATA, PCIe, SCSI, SAS, or a network standard such as an Ethernet standard.

DSD interface 105 is configured to interface controller 101 with DSDs 1 to N, and can interface according to a standard such as, for example, SATA, PCIe, SCSI, SAS, or an Ethernet standard. Although FIG. 1 depicts the co-location of controller 101 and DSDs 1 to N, in other embodiments they need not be physically co-located. For example, one or more of DSDs 1 to N can be located in a different room, building, or city than controller 101, another DSD, or host 150.

In the example of FIG. 1, controller 101 includes processor 108 which can include circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, processor 108 can include a System on a Chip (SoC).

Memory 109 can include, for example, a Dynamic Random Access Memory (DRAM) which can be used by controller 101 to temporarily store data. In the case where memory 109 is a volatile memory, data such as application 10 or write complete indications 12 can be loaded into memory 109 as needed from an NVM of controller 101. In other implementations, memory 109 can be an NVM, such as a non-volatile solid-state memory.

Data stored in memory 109 can include data read from or written to DSDs 1 to N. Memory 109 can also be used by processor 108 to perform erasure coding on data received from host 150. In more detail, processor 108 may generate and store erasure coded shards in memory 109 before sending write commands to DSDs 1 to N to store the data shards. In other implementations, host 150 erasure codes data and sends the erasure coded data shards to controller 101 for storage in DSDs 1 to N.

As shown in FIG. 1, memory 109 can also store application 10, which includes computer-executable instructions that control operation of controller 101 when executed by processor 108. In some implementations, processor 108 may also execute an object storage platform such as Ceph, Hadoop, Swarm, or OpenStack to store data objects such as photos, movies, e-commerce data, or archival data across DSDs 1 to N.

As shown in FIG. 1, application 10 can include latency calculation module 14, reliability calculation module 16, and reclaim module 18. Other implementations may include different modules for application 10.

As discussed in more detail below with reference to the initialization process of FIG. 6, an overprovisioned number of data shards can be calculated to reduce a write latency in storing data with at least a predetermined level of data reliability or durability. In some implementations, latency calculation module 14 can be used to calculate an expected write latency for DSDs 1 to N in storing one or more data shards. In other implementations, latency calculation module 14 can be used to calculate a probability of receiving write complete indications for one or more data shards after a write latency time limit. Reliability calculation module 16 calculates a threshold number of data shards needed for a predetermined level of data reliability or durability.

As discussed in more detail below with reference to the Memory Portion (MP) reclamation process of FIG. 7, reclaim module 18 can be used to track which DSDs or MPs of DSDs 1 to N may store extra data shards or portions of data shards from the overprovisioned number of data shards. The extra data shards or portions of data shards are in addition to the threshold number of data shards needed for the predetermined level of data reliability calculated by reliability calculation module 16. The extra data shards or portions of data shards can be overwritten after the data has been written with the predetermined level of data reliability to reclaim MPs in DSDs 1 to N to store other data. Reclaim module 18 may also schedule a time for reclaiming a MP for reuse in storing data.

Write complete indications 12 can allow controller 101 to keep track of which write commands have been completed at DSDs 1 to N. In some implementations, each DSD can send controller 101 a write complete indication after a data shard has been stored in the DSD. As discussed in more detail below, controller 101 can also send a write complete indication to host 150 that data has been written with a predetermined level of data reliability after receiving write complete indications for a threshold number of data shards. In some implementations, write complete indications 12 can be used to identify DSDs that have not sent a write complete indication by the time the threshold number of shards have been stored. In other implementations, write complete indications may only provide a count of write complete indications received.

Those of ordinary skill in the art will appreciate that other embodiments can include more or less than those elements shown in FIG. 1 and that the processes disclosed below can be implemented in other environments. For example, other implementations can include a different number of hosts, controllers or DSDs, as in the example of FIG. 2A. As another example, each of DSDs 1 to N can include their own controller instead of sharing controller 101 as in the example of FIG. 1, or controller 101 may be replaced by a controller located in one of DSDs 1 to N, as in the example of FIG. 2B.

Figure 2A:
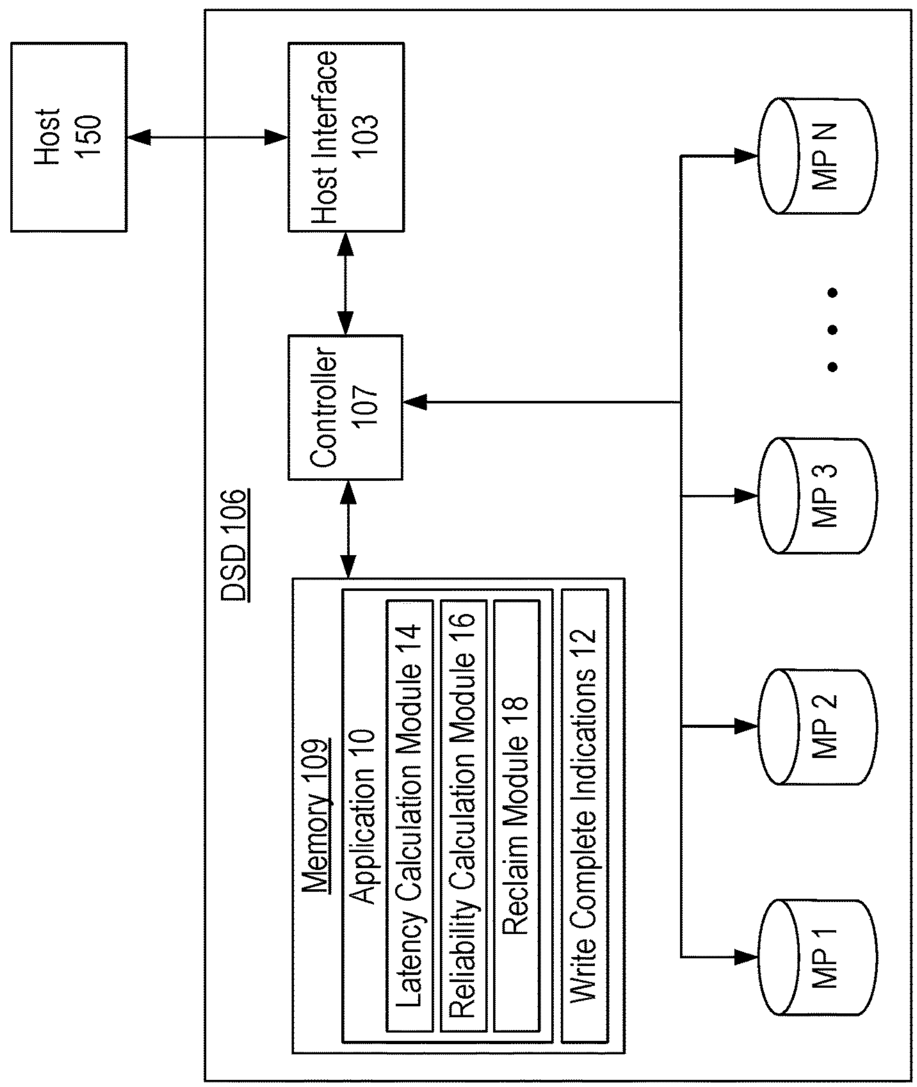
FIG. 2A is a block diagram of a Data Storage Device (DSD) according to an embodiment.

FIG. 2A is a block diagram of DSD 106 according to an embodiment where data shards are stored in different MPs of DSD 106 instead of in different DSDs of a data storage system. As compared to data storage system 100 in FIG. 1, DSD 106 includes MPs 1 to N instead of DSDs 1 to N for storing data shards generated by controller 107 or host 150. The description of host 150, host interface 103, controller 107, memory 109, application 10, latency calculation module 14, reliability calculation module 16, reclaim module 18, and write complete indications 12 can be understood with reference to the descriptions provided above for these items in FIG. 1.

Each of MPs 1 to N can include, for example, one or more rotating magnetic disks and/or solid-state memories. In some implementations, MPs 1 to N can represent different portions of a single storage medium such as different dies, blocks, or pages within a solid-state memory or different zones of tracks or disk surfaces on a disk. Each MP may have its own sub-controller (not shown) that controls operation of the MP. In other implementations, MPs of a particular storage media type may share a sub-controller that controls operation of MPs of the same storage media type.

Figure 2B:
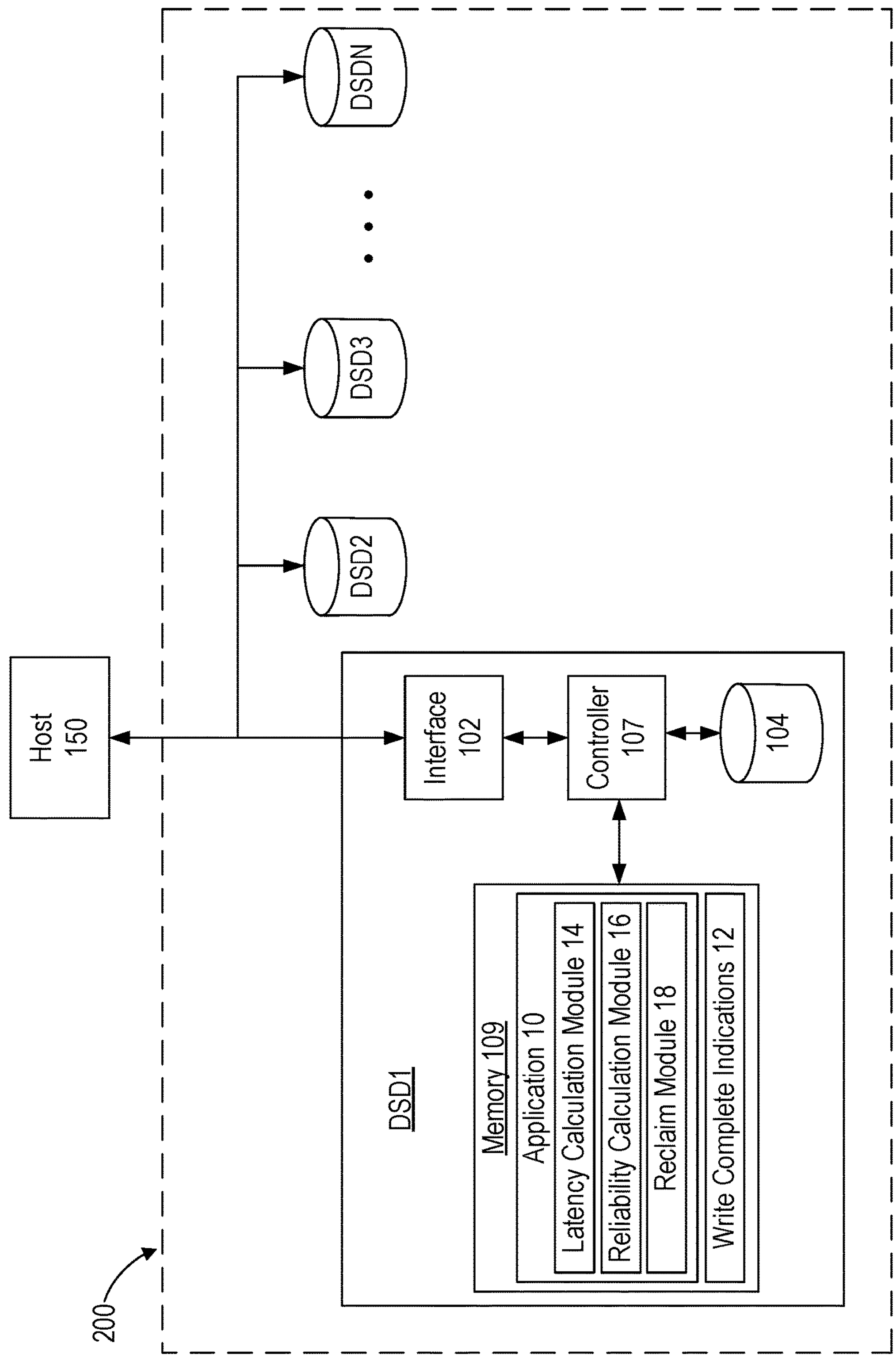
FIG. 2B is a block diagram of a data storage system according to an embodiment.

FIG. 2B is a block diagram of data storage system 200 according to an embodiment where DSD 1 in data storage system 200 controls the storage of data shards in other DSDs in data storage system 200. The description of host 150, controller 107, memory 109, application 10, latency calculation module 14, reliability calculation module 16, reclaim module 18, and write complete indications 12 can be understood with reference to the descriptions provided above for these items in FIG. 1.

As compared to data storage system 100 in FIG. 1, DSD 1 in FIG. 2B takes on the role of controller 101 in sending write commands to store data shards in DSDs 2 to N and receiving write complete indications 12. In some implementations, DSD 1 may also store one or more data shards in its own memory or MP 104. The data shards may be generated by controller 107 of DSD 1 or by host 150.

In some implementations, controller 107 may execute an object storage platform as part of application 10 or as a separate application. Examples of such storage platforms can include Ceph, Hadoop, Swarm, or OpenStack to store data objects such as photos, movies, e-commerce data, or archival data across DSDs 1 to N.

As shown in FIG. 2B, interface 102 is configured to interface controller 107 with host 150 and with other DSDs in data storage system 200 (i.e., DSDs 1 to N). Interface 102 may use a standard such as, for example, SATA, PCIe, SCSI, SAS, or a network standard such as an Ethernet standard. In some implementations, a separate interface may be used for host 150 and DSDs 1 to N.

Each of DSDs 1 to N may include non-volatile memory or MPs, such as one or more rotating magnetic disks and/or solid-state memories. Each DSD may also have its own controller that controls operation of the DSD. In some implementations, any of DSDs 1 to N can include a controller, such as controller 107, to control the storage of shards in other DSDs and perform the example processes discussed below.

Overprovisioning Examples

FIGS. 3A and 3B illustrate an example comparing an overall write latency without using an overprovisioned number of shards in FIG. 3A to an overall write latency when using an overprovisioned number of erasure coded shards in FIG. 3B. As shown in FIG. 3A, write complete indications are received for all 18 DSDs or MPs at time T4 with DSD/MP 2 being the last DSD/MP to indicate a completed write.

At time T4 in FIG. 3A, the data has been written with a predetermined level of data reliability or durability of EC 13/18 since all 18 shards have been stored. In other words, the retrieval of five shards can fail after T4 and the original data could still be reconstructed with only the remaining 13 shards.

However, in the example of FIG. 3A, the overall write latency for writing the data with the predetermined level of data reliability is only as fast as the slowest DSD/MP to write its shard or shards. As a result, the data cannot be counted as written or committed to NVM with the predetermined level of data reliability until write complete indications are received for all 18 DSDs/MPs. In the example of FIG. 3A, the overall write latency is defined by the slowest DSD/MP. The overall write latency can delay an indication to host 150 that the data has been written with the predetermined level of reliability. This, in turn, can reduce the performance of host 150, such as where host 150 must wait for the data to be written with the predetermined level of data reliability before proceeding to other commands.

In contrast to the example of FIG. 3A, the example of FIG. 3B overprovisions the number of shards by adding an additional shard to be stored in DSD/MP 19. As shown in FIG. 3B, the overall write latency for writing the data with the same level of data reliability is reduced from time T4 in FIG. 3A to time T3 in FIG. 3B, since write complete indications have been received for 18 of the 19 shards by time T3. Notably, the data reliability remains the same with EC 13/18 at time T3 since it does not matter which 18 shards of the total 19 overprovisioned shards have been written. Any of the 18 shards written by time T3 can be used to reconstruct the original data.

Figure 4:
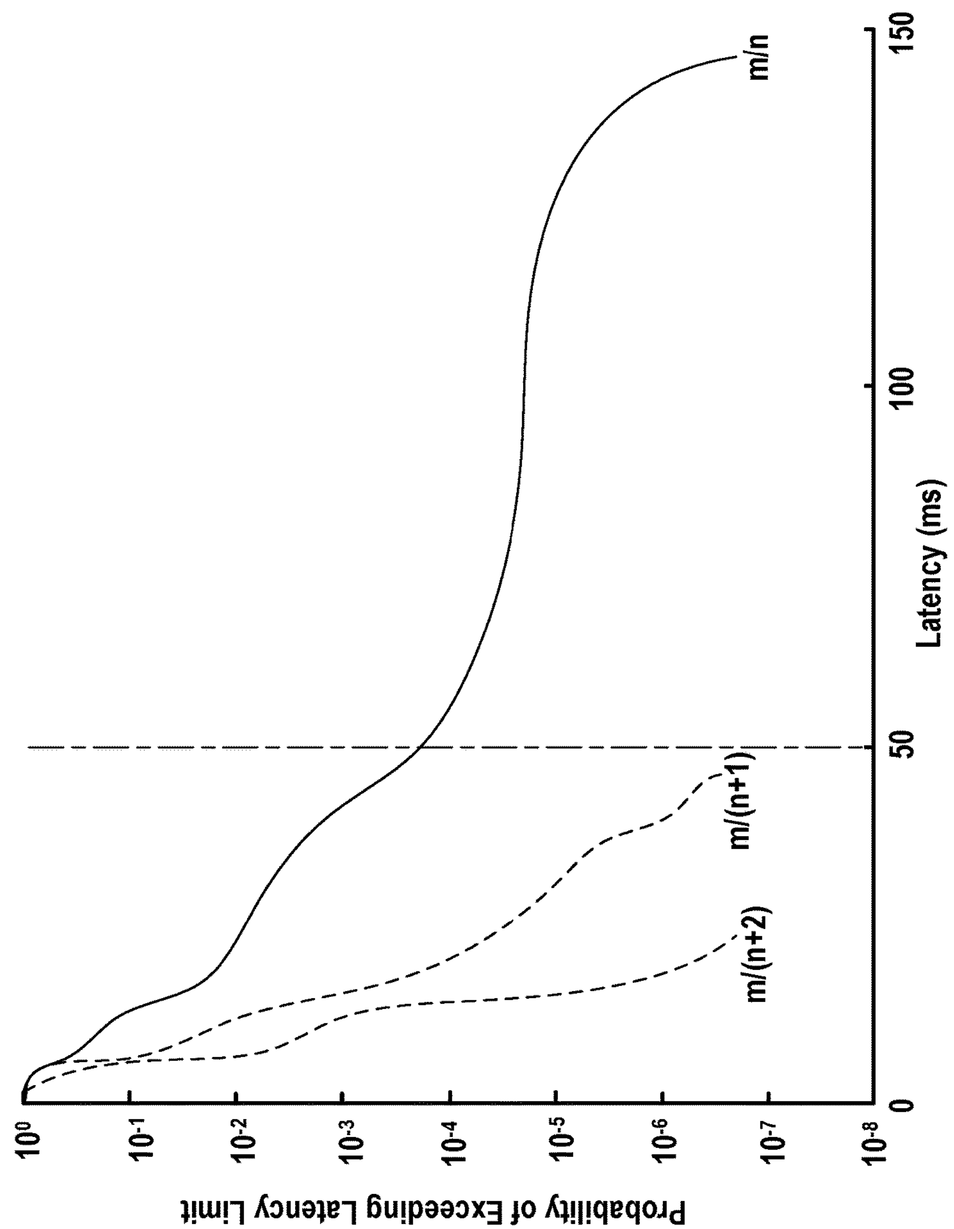
FIG. 4 is a graph correlating write latency at a predetermined level of data reliability and the probability of exceeding a write latency limit for different numbers of shards according to an embodiment.

As shown in FIGS. 3A and 3B, and further illustrated in FIG. 4, overprovisioning the number of shards can ordinarily reduce an overall write latency without sacrificing data reliability.

FIG. 4 further demonstrates the advantages of overprovisioning the number of data shards to reduce write latency. FIG. 4 compares the time it takes for n shards to be written without overprovisioning to the time it takes to write the n shards when overprovisioning with n+1 total shards or n+2 total shards. In the example of FIG. 4, m represents the number of fragments (without parity) that an original data object is divided into.

FIG. 4 also shows the probabilities of exceeding a 50 ms write latency time limit for the two examples of shard overprovisioning and the example without shard overprovisioning. The probabilities shown in FIG. 4 are expressed as orders of magnitude on a logarithmic scale.

The dashed line for EC m/(n+1) includes one extra shard for a total of n+1 overprovisioned shards and the dashed line for EC m/(n+2) includes two extra shards for a total of n+2 overprovisioned shards. As shown in FIG. 4, the overall write latency or time it takes to write n shards without overprovisioning (i.e., the solid line for EC m/n) is nearly 150 ms. In contrast, this overall write latency is reduced to less than 50 ms by adding an extra shard (i.e., the dashed line for EC m/(n+1)). The overall write latency is even further reduced by adding a second shard (i.e., the dashed line for EC m/(n+2)).

Similarly, the probability of exceeding a write latency time limit of 50 ms for writing the data with a level of data reliability of EC m/n decreases by adding an extra shard, and the probability of exceeding the latency limit decreases even further by adding the second extra shard.

Although adding more shards will add more overhead and may result in more write commands because there are additional shards, the overall write latency unexpectedly decreases for writing data at the predetermined level of data reliability (e.g., EC 13/18) because only the first n shards need to be written. This can allow for the fastest DSDs or fastest MPs to provide write complete indications and eliminate the need to wait for the slowest performing DSD(s)/MP(s) to provide a write complete indication to host 150.

Figure 5:
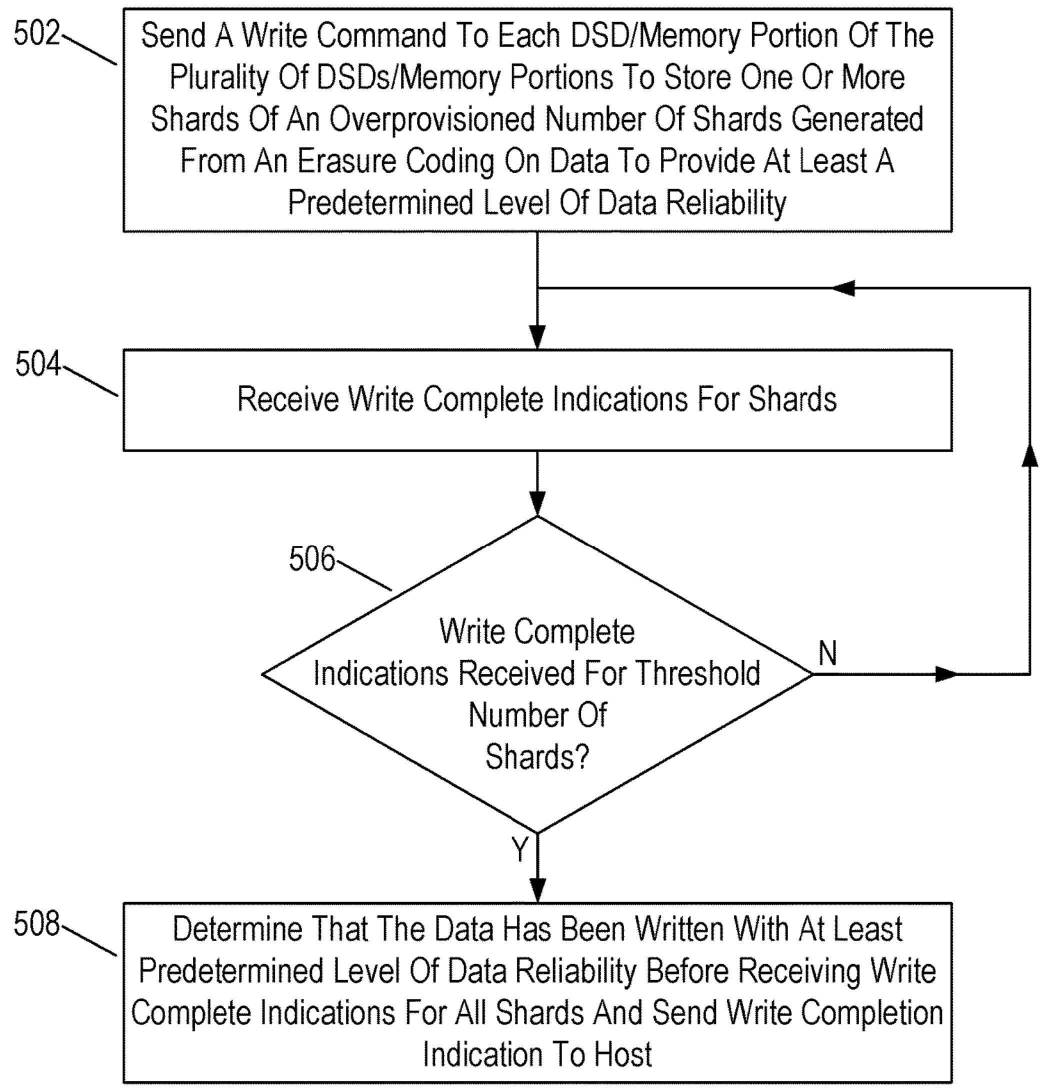
FIG. 5 is a flowchart for a write process using an overprovisioned number of shards according to an embodiment.

FIG. 5 is a flowchart for a write process using an overprovisioned number of shards according to an embodiment. The process of FIG. 5 can be performed by, for example, controller 101 of FIG. 1 where multiple DSDs are managed by an external controller, controller 107 in FIG. 2A where multiple MPs within a DSD are managed by an internal controller, or controller 107 in FIG. 2B where a DSD manages the storage of data in other DSDs in a data storage system. In some implementations, an external host such as host 150 may serve as the controller in performing the process of FIG. 5 described below.

In block 502, a write command is sent to each DSD or MP of a plurality of DSDs or MPs to store one or more shards of an overprovisioned number of shards. In some implementations, the write command may command each MP or DSD to store a single shard. In other implementations, each MP or DSD may store multiple shards. The controller sending the write commands in block 502 may also generate the shards by erasure coding data, such as data received from host 150 or another device, to provide at least a predetermined level of data reliability (e.g., EC 13/18). In other implementations, a device such as host 150 may generate the erasure coded shards and send the shards to the controller for storage in DSDs of a data storage system or for storage in MPs of a DSD.

In block 504, the controller receives write complete indications for the write commands sent in block 502. The write complete indications can come from, for example, one or more sub-controllers that control operation of the MPs or from DSDs in a data storage system to indicate that the data shard or shards sent to the MP or DSD have been committed to NVM. As discussed above with reference to FIGS. 3A to 4, some DSDs or MPs may be faster than others in writing data shards and/or providing a write complete indication to the controller.

In block 506, the controller determines whether write complete indications have been received for a threshold number of shards. The threshold number of shards corresponds to the predetermined level of data reliability. For example, the threshold number of shards for a predetermined level of data reliability of EC 13/18 would be 18 shards. If write complete indications have not been received for the threshold number of shards in block 506, the process returns to block 504 to continue to receive write complete indications for the shards until write complete indications have been received for the threshold number of shards.

After receiving write complete indications for the threshold number of shards, the controller in block 508 determines that the data has been written with at least the predetermined level of data reliability before receiving write complete indications for all of the shards. In block 508, the controller may also return a write complete indication to a host or other device that sent a write command to store the data or data shards.

Figure 6:
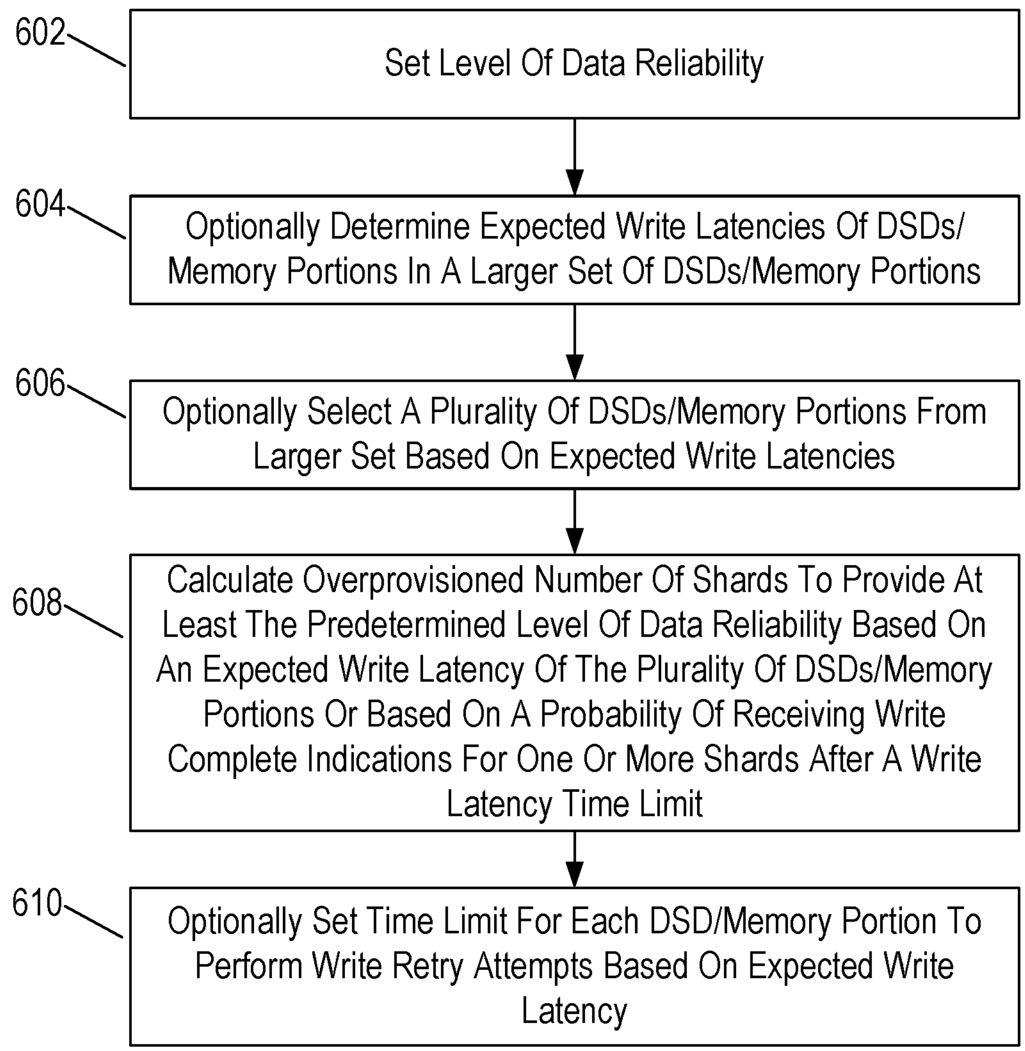
FIG. 6 is a flowchart for an initialization process for using an overprovisioned number of shards according to an embodiment.

FIG. 6 is a flowchart for an initialization process for using an overprovisioned number of shards according to an embodiment. As with the write process of FIG. 5, the initialization process of FIG. 6 can be performed by, for example, controller 101 of FIG. 1, controller 107 in FIG. 2A, or controller 107 in FIG. 2B. In some implementations, an external host such as host 150 may serve as the controller in performing the process of FIG. 6 described below.

In block 602, the controller sets a level of data reliability. As discussed above, the level of data reliability can correspond to a number of shards that need to be committed to NVM before achieving the level of data reliability. The level of data reliability set in block 602 may be based on an input from a user, an application (e.g., reliability calculation module 16), or a storage platform (e.g., Ceph) of a data storage system. In some implementations, a user or application executing on host 150 may provide an input for setting the predetermined level of data reliability in block 602.

In block 604, the controller optionally determines expected write latencies for different MPs or DSDs in a larger set of DSDs or MPs that include the plurality of DSDs or MPs that will be used to store the data shards. In some implementations, latency calculation module 14 can be used to calculate the expected write latencies. The indications of expected write latencies can consider at least one of activity levels of DSDs or MPs, a physical characteristic of DSDs or MPs, and an activity level of the data storage system or DSD including the MPs.

The activity level of a particular DSD or MP may, for example, indicate a number of pending commands (e.g., write commands and/or read commands) queued for the DSD or MP, or an average command queue depth over a predetermined period of time. The physical characteristic of a particular DSD or MP may include, for example, a storage media type (e.g., rotating magnetic disk or solid-state memory), a location on a network, or a write speed specified for the DSD or MP. In this regard, certain DSDs or MPs may have a faster write speed than other DSDs or MPs due to physical differences such as having a faster actuator for seeking to a location on a disk, being able to rotate a disk at a higher rotational speed, or using a physically different type of solid-state memory (e.g., MRAM versus NAND, the number of bits per cell at which NAND is written, etc.). The activity level of the data storage system or the DSD including the MPs may consider, for example, network activity or an average time to complete commands in the data storage system or DSD.

In some implementations, the expected write latencies in block 604 may be provided from the DSD or from a sub-controller that controls operation of the MP. In other implementations, the expected write latencies may come from an external device such as host 150, which may provide the indications of expected write latencies. In yet other implementations, the controller performing the process of FIG. 6 may determine the expected write latencies based on information collected or observed from the DSDs or MPs.

In block 606, the controller optionally selects the plurality of DSDs or MPs for storing data shards from the larger set of DSDs or MPs based on the expected write latencies determined in block 604. In other implementations, blocks 604 and 606 may be omitted so that all of the DSDs or MPs in the data storage system or DSD are to store one or more data shards. In yet other implementations, the controller may select DSDs or MPs for storing data shards based on factors in addition to or in place of an expected write latency, such as a frequency of use, a remaining available storage capacity, a remaining expected useable life, or a power consumption of the DSD or MP.

In block 608, the controller uses latency calculation module 16 to calculate an overprovisioned number of shards to provide at least the predetermined level of data reliability set in block 602. The calculation in block 608 is based on an expected write latency or on a probability of receiving write complete indications for one or more shards after a write latency time limit. The overprovisioned number of shards can be represented as a total number of overprovisioned shards (e.g., 19 shards for EC 13/(18+1)) or as a number of additional overprovisioned shards (e.g., 1 additional shard for EC 13/(18+1)).

In the case where the calculation of the overprovisioned number of shards is based on an expected write latency, the controller can determine an expected write latency of the plurality of DSDs or MPs that will store data shards. Similar to block 604 discussed above, the controller may consider at least one of activity levels of DSDs or MPs, a physical characteristic of DSDs or MPs, and an activity level of the data storage system or DSD including the MPs. For example, one or more of the DSDs in a data storage system can include a first type of storage media (e.g., magnetic disk storage media) associated with an expected first write latency, and one or more of the DSDs in the data storage system can include a second type of storage media (e.g., solid-state storage media) associated with an expected second write latency different from the first expected write latency. The controller in block 608 can consider both expected write latencies in determining an overall expected write latency for the plurality of DSDs or MPs.

On the other hand, the controller in block 608 may calculate the overprovisioned number of shards based on a probability of receiving write complete indications for one or more shards after a write latency time limit. For example, the probabilities shown in FIG. 4 can be used to calculate a total number of shards to help ensure to a certain probability that the data is written with the predetermined level of data reliability within a latency time limit such as 50 ms. The probabilities shown in FIG. 4 may, for example, be the result of numerous simulations or information collected from previous performance of the data storage system or DSD including the MPs.

In block 610, the controller optionally sets a time limit for each DSD or MP in the plurality of DSDs or MPs to perform write retry attempts based on the expected write latency or probability determined in block 608. This can conserve processing and memory resources at a DSD or MP that encounters an error when writing a data shard. If the DSD or MP exceeds the time limit, it may be very unlikely that a write complete indication from the DSD or MP would still be needed to reach write completions for the threshold number of shards.

Figure 7:
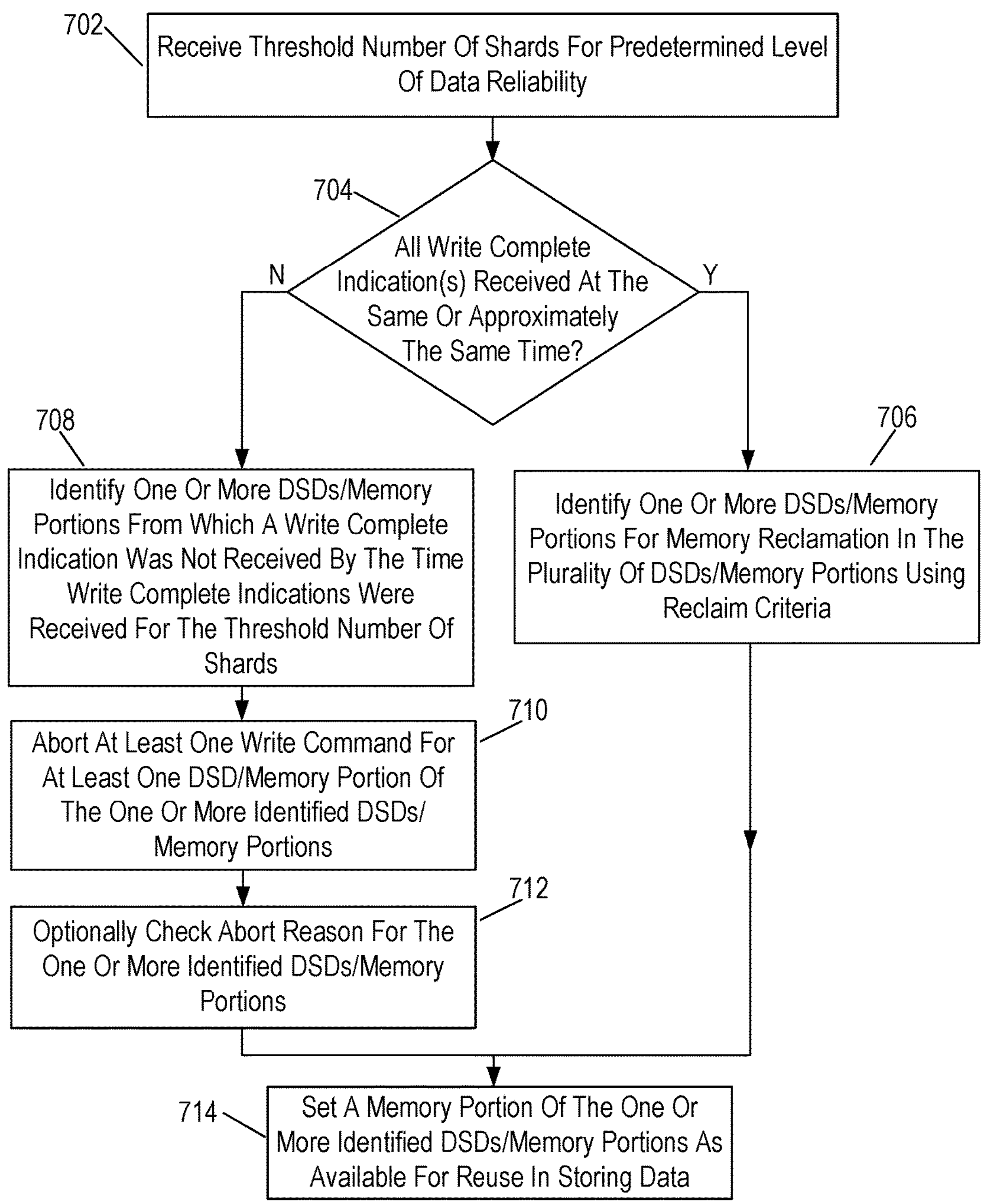
FIG. 7 is a flowchart for a write process including Memory Portion (MP) reclamation according to an embodiment.

FIG. 7 is a flowchart for a write process including MP reclamation according to an embodiment. The write process of FIG. 7 is performed after the controller has sent write commands to store the overprovisioned number of shards. The write process of FIG. 7 can be performed by, for example, controller 101 of FIG. 1, controller 107 in FIG. 2A, or controller 107 of FIG. 2B. In some implementations, an external host such as host 150 may serve as the controller in performing the process of FIG. 7 described below.

In block 702, the controller receives the threshold number of shards for the predetermined level of data reliability. For example, in a case where the predetermined level of data reliability is EC 13/18, the threshold number of shards would be 18 shards.

After receiving the threshold number of shards in block 702, the controller in block 704 determines whether write complete indications for all of the data shards were received at the same time or at approximately the same time. Although the write complete indications may actually arrive at slightly different times, the controller considers the write complete indications to have arrived at the same or at approximately the same time if the write complete indications are received within a smallest detectable unit of time (e.g., 1 ms) or within another predetermined window of time (e.g., 10 ms).

If the write complete indications are received at the same or at approximately the same time, the controller in block 706 can use reclaim module 18 to identify one or more DSDs or MPs for memory reclamation in the plurality of DSDs or MPs. This can allow the controller to reuse storage space that stores the extra shards used for overprovisioning to conserve storage space. The DSDs or MPs can be identified in block 706 by reclaim module 18 using reclaim criteria. The reclaim criteria can consider, for example, a remaining available storage capacity, a frequency of use, or an expected remaining useable life of the DSD or MP.

In block 714, the controller sets an MP of the one or more identified DSDs or MPs as available for reuse in storing data. In some implementations, the performance of block 714 may involve garbage collection where valid data is read from the reclaimed MP and rewritten so that the valid data is not overwritten in the reclaimed MP. The controller may also defer performing garbage collection in block 714 by scheduling a later time for reclaiming the set MP or MPs. This scheduling can, for example, be based on historical data access patterns or triggered by an activity such as entering an idle state.

If it is determined in block 704 that not all the write complete indications are received at the same time or at approximately the same time, the controller in block 708 identifies one or more DSDs or MPs from which a write complete indication was not received by the time write complete indications were received for the threshold number of shards. In some implementations, a data structure such as write complete indications 12 in FIGS. 1 and 2 can be used to identify the DSDs or MPs that sent late indications. In other implementations, the controller may keep track of which DSDs or MPs have completed writes based on information included in the write complete indications.

In block 710, the controller aborts at least one write command for at least one of the DSDs or MPs of the one or more DSDs or MPs identified in block 708. This can allow the controller to conserve processing resources or storage space that may otherwise be consumed if the write command or commands are allowed to complete. In other implementations, block 710 can be omitted so that all of the data shards are allowed to complete.

In block 712, the controller may check an abort reason for the one or more identified DSDs or MPs where a write command was aborted in block 710. In some cases, the abort reason can indicate a problem with the DSD or MP that can affect the storage of shards in the future. For example, the abort reason may indicate write errors when attempting to store the data shard or that a time limit for performing the write operation was exceeded. The controller may then use the abort reason to perform or schedule a background maintenance operation on the DSD or MP or to remove the DSD or MP from the plurality of DSDs or MPs when storing data shards in the future.

In other implementations, the controller may only check the abort reason if the write complete indication for the DSD or MP is not received at all or is not received after a predetermined period of time (e.g., 100 ms) indicating a possible problem with the DSD or MP. In yet other implementations, block 714 may be omitted so that the abort reason is not considered.

In one example, the abort reason may indicate that write errors prevented a DSD or MP from completing a write command. The controller may then schedule a write verification operation for the DSD or MP to verify that the DSD or MP is still capable of storing data. The write verification can include, for example, accessing data written to the DSD or MP to verify that the data has been stored. This can allow for the detection of a failure or a reduced data storage reliability of a DSD or MP so that the DSD or MP can be replaced or removed from the plurality of DSDs for future write commands.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage system, comprising:

a plurality of Data Storage Devices (DSDs) for storing data; and a controller in communication with the plurality of DSDs, the controller configured to:

receive a write request to write data on the data storage system;

responsive to the write request, and prior to sending a write command corresponding to the data to any DSDs, calculate an overprovisioned number of shards corresponding to the data, wherein:

the overprovisioned number of shards is generated from an erasure coding on the data to provide at least a predetermined level of data reliability; and the overprovisioned number of shards is characterized by:

(a) a first number of shards that is the minimum number of shards to reconstruct the data, (b) a second number of shards that is a threshold number of shards needed to commit the write command to the controller at the predetermined level of reliability, the second number of shards being in addition to the first number of shards, and (c) a third number of one or more shards that is a fixed number of overprovisioned shards to reduce write latency corresponding to committing the write command, the third number of shards being in addition to the second number of shards;

send a write command to each DSD of the plurality of DSDs to each store one or more erasure coded shards of the overprovisioned number of shards;

receive write complete indications, based on the write command, for the threshold number of shards, wherein each write complete indication indicates that one or more shards of the overprovisioned number of shards has been stored in a DSD, and wherein the threshold number of shards is less than the overprovisioned number of shards; and determine that the data has been written with at least the predetermined level of data reliability after receiving write complete indications for the threshold number of shards, but before receiving write complete indications for all of the overprovisioned number of shards.

2. The data storage system of claim 1, wherein the controller is further configured to calculate the overprovisioned number of shards based on an expected write latency of the plurality of DSDs.

3. The data storage system of claim 2, wherein the controller is further configured to determine the expected write latency for the plurality of DSDs based on at least one of activity levels of DSDs of the plurality of DSDs, a physical characteristic of DSDs of the plurality of DSDs, and an activity level of the data storage system.

4. The data storage system of claim 1, wherein the controller is further configured to calculate the overprovisioned number of shards based on a probability of receiving write complete indications for one or more shards after a write latency time limit.

5. The data storage system of claim 1, wherein the controller is further configured to:

identify one or more DSDs from which a write complete indication was not received by the time the write completion indications for the threshold number of shards were received; and set a memory portion of the one or more identified DSDs as available for reuse in storing data.

6. The data storage system of claim 5, wherein the controller is further configured to schedule a time for reclaiming the memory portion of the one or more identified DSDs for reuse in storing data.

7. The data storage system of claim 1, wherein the controller is further configured to:

identify one or more DSDs from which a write complete indication was not received by the time the write completion indications for the threshold number of shards were received; and perform a write verification operation on the one or more identified DSDs.

8. The data storage system of claim 1, wherein the controller is further configured to abort at least one write command for at least one DSD that has not provided a write complete indication by the time the write complete indications are received for the threshold number of shards.

9. The data storage system of claim 1, wherein the controller is further configured to allow at least one write command to complete for at least one DSD that has not provided a write complete indication by the time the write complete indications are received for the threshold number of shards.

10. The data storage system of claim 1, wherein the controller is further configured to set a time limit for each DSD of the plurality of DSDs to perform write retry attempts after a write error based on an expected write latency of the plurality of DSDs or based on a probability of receiving write complete indications for one or more shards after a write latency time limit.

11. The data storage system of claim 1, wherein the controller is further configured to:

determine expected write latencies for a larger set of DSDs including the plurality of DSDs; and select the plurality of DSDs from the larger set of DSDs based on the expected write latencies.

12. The data storage system of claim 1, wherein the plurality of DSDs includes:

a first media type DSD including a first type of storage media associated with an expected first write latency; and a second media type DSD including a second type of storage media associated with an expected second write latency.

13. The data storage system of claim 12, wherein:

the first media type DSD is a Solid-State Drive (SSD); and the second media type DSD is a Hard Disk Drive (HDD).

14. A method of storing data in a data storage system including a plurality of Data Storage Devices (DSDs), the method comprising:

receiving a write request to write data on the data storage system;

responsive to the write request, and prior to sending a write command corresponding to the data to any DSDs, calculating an overprovisioned number of shards corresponding to the data, wherein:

the overprovisioned number of shards is generated from an erasure coding on the data to provide at least a predetermined level of data reliability; and the overprovisioned number of shards is characterized by:

(a) a first number of shards that is the minimum number of shards to reconstruct the data, (b) a second number of shards that is a threshold number of shards needed to commit the write command at the predetermined level of reliability, the second number of shards being in addition to the first number of shards, and (c) a third number of one or more shards that is a fixed number of overprovisioned shards to reduce write latency corresponding to committing the write command, the third number of shards being in addition to the second number of shards;

sending a write command to each DSD of the plurality of DSDs to each store one or more erasure coded shards of the overprovisioned number of shards;

receiving write complete indications, based on the write command, for the threshold number of shards, wherein each write complete indication indicates that one or more shards of the overprovisioned number of shards has been stored in a DSD, and wherein the threshold number of shards is less than the overprovisioned number of shards; and determining that the data has been written with at least the predetermined level of data reliability after receiving write complete indications for the threshold number of shards, but before receiving write complete indications for all of the overprovisioned number of shards.

15. The method of claim 14, further comprising calculating the overprovisioned number of shards based on an expected write latency of the plurality of DSDs.

16. The method of claim 15, further comprising determining the expected write latency for the plurality of DSDs based on at least one of activity levels of DSDs of the plurality of DSDs, a physical characteristic of DSDs of the plurality of DSDs, and an activity level of the data storage system.

17. The method of claim 14, further comprising calculating the overprovisioned number of shards based on a probability of receiving write complete indications for one or more shards after a write latency time limit.

18. The method of claim 14, further comprising:

identifying one or more DSDs from which a write complete indication was not received by the time the write completion indications for the threshold number of shards were received; and setting a memory portion of the one or more identified DSDs as available for reuse in storing data.

19. The method of claim 18, further comprising scheduling a time for reclaiming the set memory portion of the one or more identified DSDs for reuse in storing data.

20. The method of claim 14, further comprising:

identifying one or more DSDs from which a write complete indication was not received by the time the write completion indications for the threshold number of shards were received; and performing a write verification operation on the one or more identified DSDs.

21. The method of claim 14, further comprising aborting at least one write command for at least one DSD that has not provided a write complete indication by the time the write complete indications are received for the threshold number of shards.

22. The method of claim 14, further comprising allowing at least one write command to complete for at least one DSD that has not provided a write complete indication by the time the write complete indications are received for the threshold number of shards.

23. The method of claim 14, further comprising setting a time limit for each DSD of the plurality of DSDs to perform write retry attempts after a write error based on an expected write latency of the plurality of DSDs or based on a probability of receiving write complete indications for one or more shards after a write latency time limit.

24. The method of claim 14, further comprising:

determining expected write latencies for a larger set of DSDs including the plurality of DSDs; and selecting the plurality of DSDs from the larger set of DSDs based on the expected write latencies.

25. A Data Storage Device (DSD), comprising:

a plurality of memory portions for storing data; and a controller configured to:

receive a write request to write data on the data storage system;

responsive to the write request, and prior to sending a write command corresponding to the data to any DSDs, calculate an overprovisioned number of shards corresponding to the data, wherein:

the overprovisioned number of shards is generated from an erasure coding on the data to provide at least a predetermined level of data reliability; and the overprovisioned number of shards is characterized by:

(a) a first number of shards that is the minimum number of shards to reconstruct the data, (b) a second number of shards that is a threshold number of shards needed to commit the write command at the predetermined level of reliability, the second number of shards being in addition to the first number of shards, and (c) a third number of one or more shards that is a fixed number of overprovisioned shards to reduce write latency corresponding to committing the write command, the third number of shards being in addition to the second number of shards;

send a write command to each memory portion of the plurality of memory portions to each store one or more erasure coded shards of the overprovisioned number of shards;

receive write complete indications, based on the write command, for the threshold number of shards, wherein each write complete indication indicates that one or more shards of the overprovisioned number of shards has been stored in a memory portion, and wherein the threshold number of shards is less than the overprovisioned number of shards; and determine that the data has been written with at least the predetermined level of data reliability after receiving write complete indications for the threshold number of shards, but before receiving write complete indications for all of the overprovisioned number of shards.

26. The DSD of claim 25, wherein the controller is further configured to calculate the overprovisioned number of shards based on an expected write latency of the plurality of memory portions or based on a probability of receiving write complete indications for one or more shards after a write latency time limit.

27. A host, comprising:

an interface for communicating with a data storage system including a plurality of Data Storage Devices (DSDs); and a processor configured to:

receive a write request to write data on the data storage system;

responsive to the write request, and prior to sending a write command corresponding to the data to any DSDs, calculate an overprovisioned number of shards corresponding to the data, wherein:

the overprovisioned number of shards is generated from an erasure coding on the data to provide at least a predetermined level of data reliability; and the overprovisioned number of shards is characterized by:

(a) a first number of shards that is the minimum number of shards to reconstruct the data, (b) a second number of shards that is a threshold number of shards needed to commit the write command at the predetermined level of reliability, the second number of shards being in addition to the first number of shards, and (c) a third number of one or more shards that is a fixed number of overprovisioned shards to reduce write latency corresponding to committing the write command, the third number of shards being in addition to the second number of shards;

send a write command via the interface to each DSD of the plurality of DSDs to each store one or more erasure coded shards of the overprovisioned number of shards;

receive write complete indications, based on the write command, via the interface from the data storage system for the threshold number of shards, wherein each write complete indication indicates that one or more shards of the overprovisioned number of shards has been stored in a DSD of the data storage system, and wherein the threshold number of shards is less than the overprovisioned number of shards; and determine that the data has been written with at least the predetermined level of data reliability after receiving write complete indications for the threshold number of shards, but before receiving write complete indications for all of the overprovisioned number of shards.

28. A Data Storage Device (DSD) in a data storage system including a plurality of DSDs, the DSD comprising:

an interface for communicating with the plurality of DSDs; and a controller configured to:

receive a write request to write data on the data storage system;

responsive to the write request, and prior to sending a write command corresponding to the data to any DSDs, calculate an overprovisioned number of shards corresponding to the data, wherein:

the overprovisioned number of shards is generated from an erasure coding on the data to provide at least a predetermined level of data reliability; and the overprovisioned number of shards is characterized by:

(a) a first number of shards that is the minimum number of shards to reconstruct the data, (b) a second number of shards that is a threshold number of shards needed to commit the write command at the predetermined level of reliability, the second number of shards being in addition to the first number of shards, and (c) a third number of one or more shards that is a fixed number of overprovisioned shards to reduce write latency corresponding to committing the write command, the third number of shards being in addition to the second number of shards;

send a write command via the interface to each DSD of the plurality of DSDs to each store one or more erasure coded shards of the overprovisioned number of shards:

receive write complete indications, based on the write command, via the interface for a threshold number of shards, wherein each write complete indication indicates that one or more shards of the overprovisioned number of shards has been stored in a DSD, and wherein the threshold number of shards is less than the overprovisioned number of shards; and determine that the data has been written with at least the predetermined level of data reliability after receiving write complete indications for the threshold number of shards, but before receiving write complete indications for all of the overprovisioned number of shards.

29. The data storage system of claim 3, wherein the activity levels of DSDs comprise a number of pending commands queued for a respective DSD and/or an average command queue depth over a predetermined period of time for a respective DSD.

30. A data storage system, comprising:

means for storing data;

means for receiving a write request to write data on the data storage system;

means for calculating, responsive to the write request and prior to sending a write command corresponding to the data to any DSDs, an overprovisioned number of shards corresponding to the data, wherein:

the overprovisioned number of shards is generated from an erasure coding on the data to provide at least a predetermined level of data reliability; and the overprovisioned number of shards is characterized by:

(a) a first number of shards that is the minimum number of shards to reconstruct the data, (b) a second number of shards that is a threshold number of shards needed to commit the write command to the controller at the predetermined level of reliability, the second number of shards being in addition to the first number of shards, and (c) a third number of one or more shards that is a fixed number of overprovisioned shards to reduce write latency corresponding to committing the write command, the third number of shards being in addition to the second number of shards;

means for sending a write command to each DSD of the plurality of DSDs to each store one or more erasure coded shards of the overprovisioned number of shards;

means for receiving write complete indications, based on the write command, for the threshold number of shards, wherein each write complete indication indicates that one or more shards of the overprovisioned number of shards has been stored in a DSD, and wherein the threshold number of shards is less than the overprovisioned number of shards; and means for determining that the data has been written with at least the predetermined level of data reliability after receiving write complete indications for the threshold number of shards, but before receiving write complete indications for all of the overprovisioned number of shards.

* * * * *